US010013187B2

(12) United States Patent
Yeh

(10) Patent No.: US 10,013,187 B2
(45) Date of Patent: Jul. 3, 2018

(54) MAPPING TABLE ACCESSING METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 530 days.

(21) Appl. No.: 14/829,648

(22) Filed: Aug. 19, 2015

(65) Prior Publication Data

US 2017/0024153 A1 Jan. 26, 2017

(30) Foreign Application Priority Data

Jul. 24, 2015 (TW) .............................. 104124052 A

(51) Int. Cl.
*G06F 12/00* (2006.01)
*G06F 3/06* (2006.01)
*G06F 12/02* (2006.01)

(52) U.S. Cl.
CPC .......... *G06F 3/0619* (2013.01); *G06F 3/0655* (2013.01); *G06F 3/0679* (2013.01); *G06F 12/0246* (2013.01); *G06F 2212/7201* (2013.01)

(58) Field of Classification Search
None
See application file for complete search history.

(56) References Cited

U.S. PATENT DOCUMENTS 9,542,278 B2 * 1/2017 Lin ..................... G06F 12/0246
9,575,885 B2 * 2/2017 Chen ................... G06F 12/0246

FOREIGN PATENT DOCUMENTS

KR  10-2014-0008914    1/2014
TW     I486767          6/2015

OTHER PUBLICATIONS

"Office Action of Taiwan Counterpart Application", dated Jun. 21, 2016, p. 1-p. 5.

* cited by examiner

*Primary Examiner* — Midys Rojas
(74) *Attorney, Agent, or Firm* — JCIPRNET

(57) ABSTRACT

A mapping table accessing method for a rewritable non-volatile memory module is provided. The method includes: storing a mapping record corresponding to a first physical erasing unit into the first physical erasing unit, wherein the mapping record of the first physical erasing unit is a mapping relation of physical programming units in the first physical erasing unit. The method further includes: storing a mapping record corresponding to a second physical erasing unit into the second physical erasing unit, wherein the mapping record of the second physical erasing unit is a mapping relation of physical programming units in the second physical erasing unit. A size of the mapping record of the first physical erasing unit is different from a size of the mapping record of the second physical erasing unit.

24 Claims, 10 Drawing Sheets

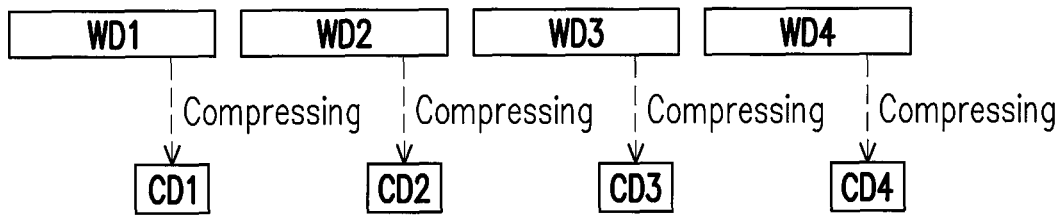
FIG. 7A
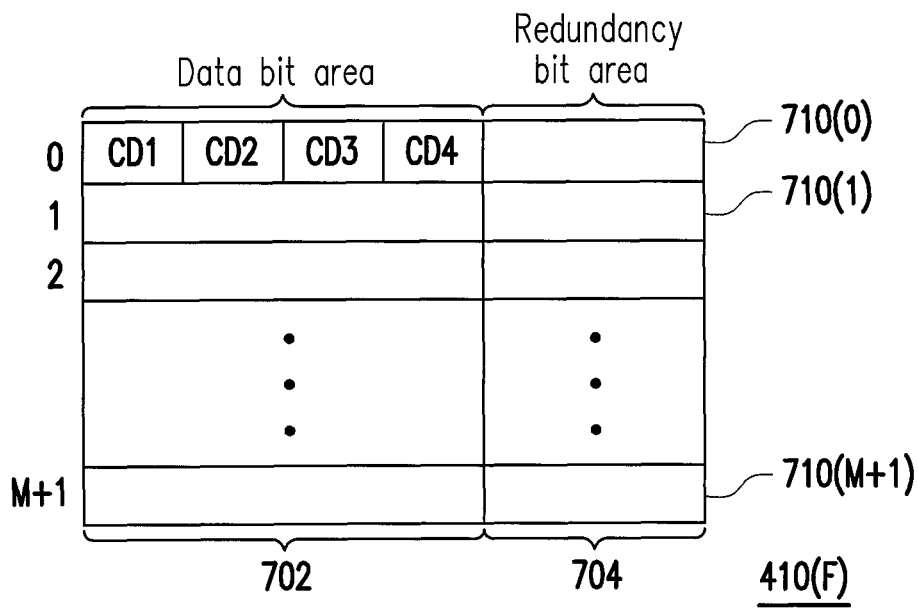
FIG. 7B
FIG. 7C

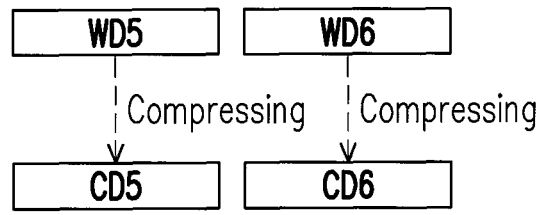
FIG. 8A
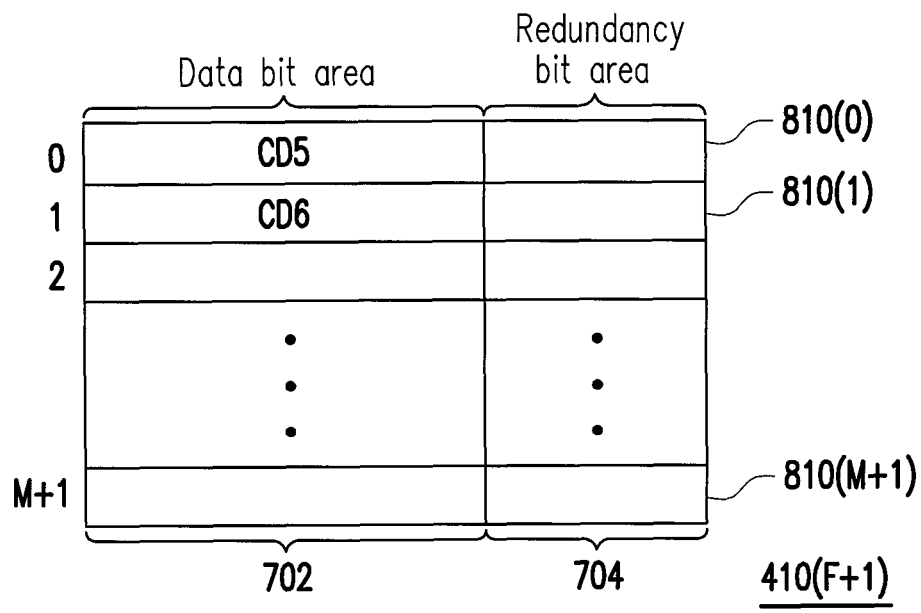
FIG. 8B
FIG. 8C

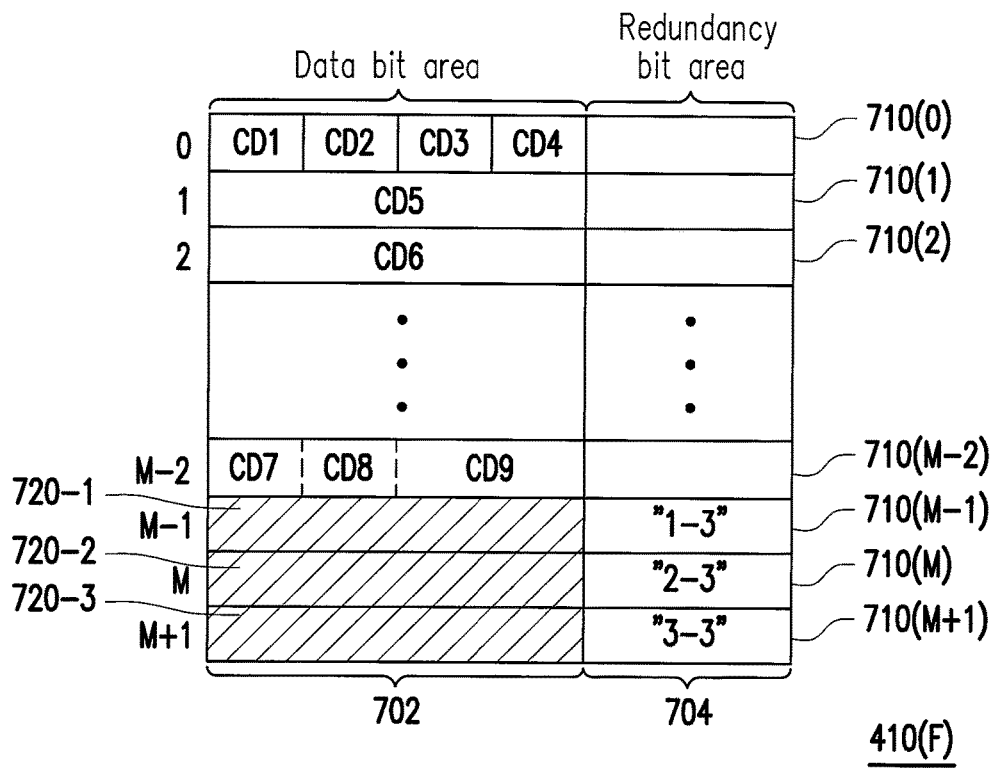

FIG. 11

| Storing a mapping record corresponding to a first physical erasing unit into the first physical erasing unit by the memory control circuit unit (or the memory management circuit), wherein the mapping record of the first physical erasing unit is a mapping relation of physical programming units in the first physical erasing unit | ~ S1201 |

| Storing a mapping record corresponding to a second physical erasing unit into the second physical erasing unit by the memory control circuit unit (or the memory management circuit), wherein the mapping record of the second physical erasing unit is a mapping relation of physical programming units in the second physical erasing unit, and a size of the mapping record of the first physical erasing unit is different from a size of the mapping record of the second physical erasing unit | ~ S1203 |

FIG. 12

MAPPING TABLE ACCESSING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104124052, filed on Jul. 24, 2015. The entirety of the above-mentioned patent application is hereby incorporated by reference herein and made a part of this specification.

BACKGROUND

Technical Field

The present invention relates to a mapping table accessing method, and more particularly, to a physical-logical mapping table accessing method for a rewritable non-volatile memory module, and a memory control circuit unit and a memory storage device using the same.

Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

Generally, a memory storage device can establish a logical-physical mapping table to record a mapping relation between logical units and physical units, such that a host system can access data in the rewritable non-volatile memory module according to the mapping relation. Specifically, each time when the host system intends to write data into the memory storage device, it is possible that the logical units corresponding to the writing data and the logical units corresponding to the previous writing data belong to different logical-physical mapping tables. Therefore, the memory storage device can establish a mapping table for temporarily storing a physical-logical corresponding relation (a physical-logical mapping table) in order to program the writing data into one active physical erasing unit and temporarily store a mapping relation between the active physical erasing unit and the logical units corresponding to the writing data into said mapping table. For example, the conventional memory storage device can write the physical-logical mapping table corresponding to the physical erasing unit from a buffer memory into a fixed space preserved in the active physical erasing unit and update the logical-physical mapping table according to the physical-logical mapping table, so as to prevent the logical-physical mapping table from being frequently updated.

However, the data is usually compressed before being written into the rewritable non-volatile memory module, such that amounts of data actually programmed into the physical programming units may be different from one another. In other words, the size of the physical-logical mapping table for storing the mapping relation corresponding to the physical programming units may be different based on a result of the data compression. As such, in the case where the data is not compressed with a compression efficiency as expected, a waste of space may occur on the active physical erasing unit when the memory storage device writes the entire physical-logical mapping table corresponding to the active physical erasing unit into the fixed space preserved in the active physical erasing unit. Accordingly, it is one of the major subjects in the industry as how to prevent the waste of space for the physical erasing unit caused by the size of the physical-logical mapping table which dynamically changes according to the data compression, so as to effectively save a system resource of the rewritable non-volatile memory.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a mapping table accessing method, a memory storage device and a memory control circuit unit, which are capable of preventing the unnecessary waste of system resource for the rewritable non-volatile memory by effectively utilizing the physical erasing unit to store the mapping table that dynamically changes its size.

A mapping table accessing method for a rewritable non-volatile memory module is provided according to an exemplary embodiment of the invention. The rewritable non-volatile memory module includes a plurality of physical erasing units, each of the physical erasing units includes a plurality of physical programming units, and each of the physical programming units includes a data bit area and a redundancy bit area. The mapping table accessing method includes: storing a mapping record corresponding to a first physical erasing unit into the first physical erasing unit, wherein the mapping record of the first physical erasing unit is a mapping relation of the physical programming units in the first physical erasing unit; and storing a mapping record corresponding to a second physical erasing unit into the second physical erasing unit, wherein the mapping record of the second physical erasing unit is a mapping relation of physical programming units in the second physical erasing unit. Herein, the size of the mapping record of the first physical erasing unit is different from the size of the mapping record of the second physical erasing unit.

An exemplary embodiment of the invention provides a memory control circuit unit configured to control a rewritable non-volatile memory module. The rewritable non-volatile memory module includes a plurality of physical erasing units, each of the physical erasing units includes a plurality of physical programming units, and each of the physical programming units includes a data bit area and a redundancy bit area. The memory control circuit unit includes a host interface, a memory interface and a memory management circuit. The host interface is configured to couple to a host system, the memory interface is configured to couple to the rewritable non-volatile memory module, and the memory management circuit is coupled to the host interface and the memory interface. The memory management circuit is configured to store a mapping record corresponding to a first physical erasing unit into the first physical erasing unit, wherein the mapping record of the first physical erasing unit is a mapping relation of physical programming units in the first physical erasing unit. The memory management circuit is further configured to store a mapping record corresponding to a second physical erasing unit into the second physical erasing unit, wherein the mapping record of the second physical erasing unit is a mapping relation of physical programming units in the second physical erasing unit. Herein, the size of the mapping record of the first physical erasing unit is different from the size of the mapping record of the second physical erasing unit.

A memory storage device is provided according to an exemplary embodiment of the invention, which includes a connection interface unit, a rewritable non-volatile memory module and a memory control circuit unit. The connection interface unit is configured to couple to a host system. The rewritable non-volatile memory module includes a plurality of physical erasing units, each of the physical erasing units includes a plurality of physical programming units, and each of the physical programming units includes a data bit area and a redundancy bit area. The memory control circuit unit is coupled to the connection interface unit and the rewritable non-volatile memory module. The memory control circuit unit is configured to store a mapping record corresponding to a first physical erasing unit into the first physical erasing unit, wherein the mapping record of the first physical erasing unit is a mapping relation of physical programming units in the first physical erasing unit. The memory control circuit unit is further configured to store a mapping record corresponding to a second physical erasing unit into the second physical erasing unit, wherein the mapping record of the second physical erasing unit is a mapping relation of physical programming units in the second physical erasing unit. Herein, the size of the mapping record of the first physical erasing unit is different from the size of the mapping record of the second physical erasing unit.

Based on the above, the invention obtains the size of the physical-logical mapping table according to the number of the table pages recorded in correspondence to the physical-logical mapping table, and reads the physical-logical mapping table according to the number of the table pages. Accordingly, the memory storage system can effectively utilize the physical erasing unit to store the mapping table that dynamically changes its size, so as to prevent the unnecessary waste of system resource for the rewritable non-volatile memory and improve the overall operation efficiency of the memory storage system.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A to FIG. 7C are schematic diagrams illustrating an example of recording the mapping relation between the physical units corresponding to the programming data being written and the logical units into the physical-logical mapping table according to an exemplary embodiment.

FIG. 8A to FIG. 8C are schematic diagrams illustrating an example of recording the mapping relation between the physical units corresponding to the writing data and the logical units into the physical-logical mapping table according to another exemplary embodiment.

FIG. 11 is a schematic diagram illustrating an example of accessing the physical-logical mapping table according to another exemplary embodiment.

FIG. 12 is a flowchart illustrating a mapping table accessing method according to an exemplary embodiment.

DESCRIPTION OF THE EMBODIMENTS

Figure 1:
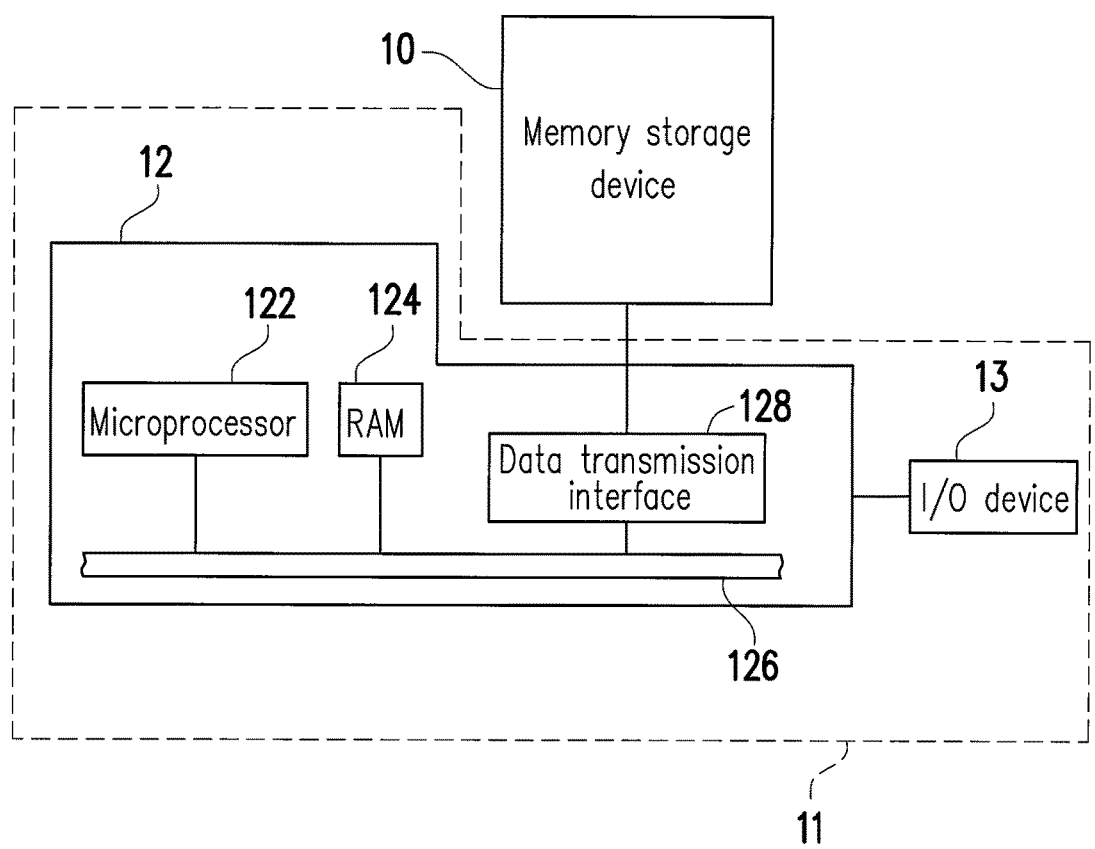
FIG. 1 is a schematic diagram illustrating a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
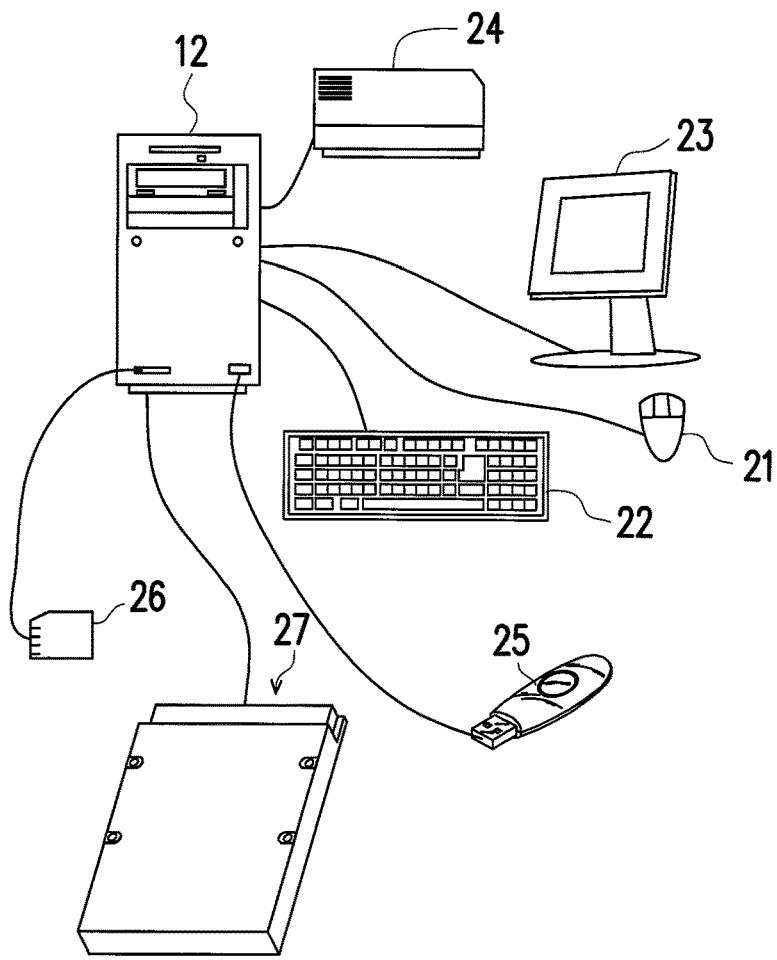
FIG. 2 is a schematic diagram illustrating a computer, an input/output device and a memory storage device according to an exemplary embodiment.

FIG. 1 is a schematic diagram illustrating a host system and a memory storage device according to an exemplary embodiment, and FIG. 2 is a schematic diagram illustrating a computer, an input/output device and a memory storage device according to an exemplary embodiment.

Referring to FIG. 1, a host system 11 includes a computer 12 and an input/output (I/O) device 1106. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In the present embodiment, the memory storage device 10 is electrically connected to other devices of the host system 11 through the data transmission interface 128. By using the microprocessor 122, the random access memory (RAM) 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
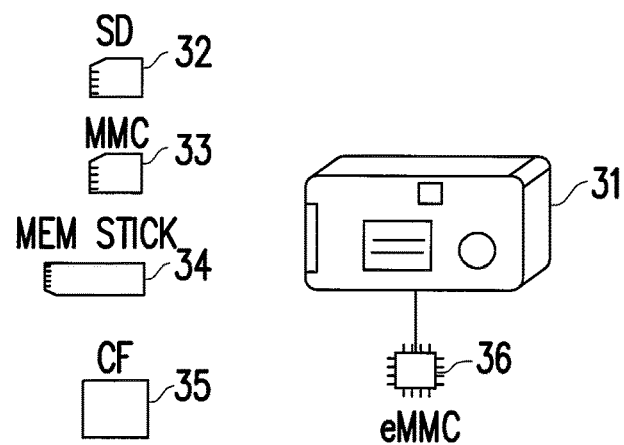
FIG. 3 is a schematic diagram of a host system and a memory storage device according to an exemplary embodiment.

FIG. 3 is a schematic diagram of a host system and a memory storage device according to an exemplary embodiment.

Generally, the host system 11 may substantially be any system capable of storing data with the memory storage device 10. Even though the host system 11 is illustrated as a computer system in the present exemplary embodiment, however, in another exemplary embodiment of the present invention, the host system 11 may be a digital camera, a video camera, a telecommunication device, an audio player, or a video player. For example, when the host system is a digital camera (video camera) 31 in FIG. 3, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC). It should be mentioned that the eMMC is electrically connected to a substrate of the host system, directly.

Figure 4:
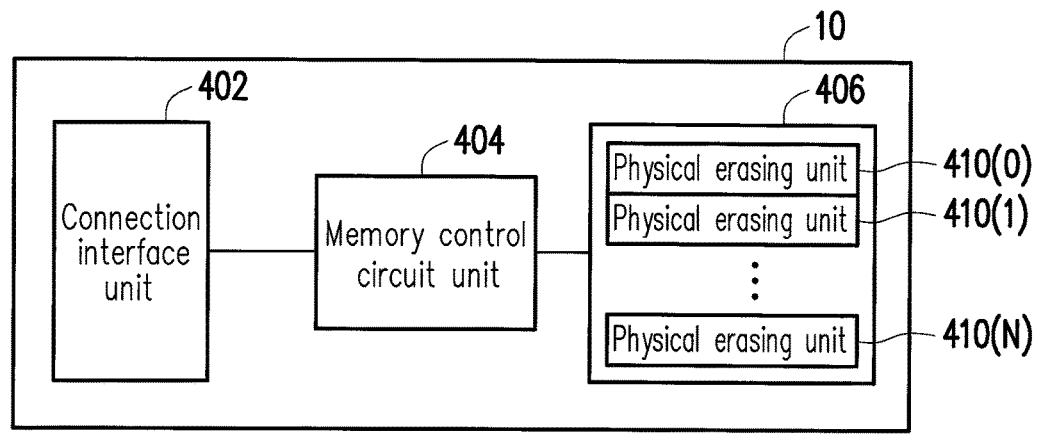
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the invention is not limited thereto, and the connection interface unit 402 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or emplaced outside of a chip containing the memory control circuit unit.

The memory control circuit unit 404 is configured to execute a plurality of logic gates or control commands which are implemented in a hardware form or in a firmware form, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also include more or less of the physical access addresses, and an amount and a size of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a Multi Level Cell (MLC) NAND flash memory module (i.e., a flash memory module capable of storing two data bits in one memory cell). However, the disclosure is not limited thereto. The rewritable non-volatile memory module 406 may also be a Single Level Cell (SLC) NAND flash memory module, (i.e., a flash memory module capable of storing one data bit in one memory cell), a Trinary Level Cell (TLC) NAND flash memory module (i.e., a flash memory module capable of storing three data bits in one memory cell), other flash memory modules or any memory module having the same features.

Figure 5:
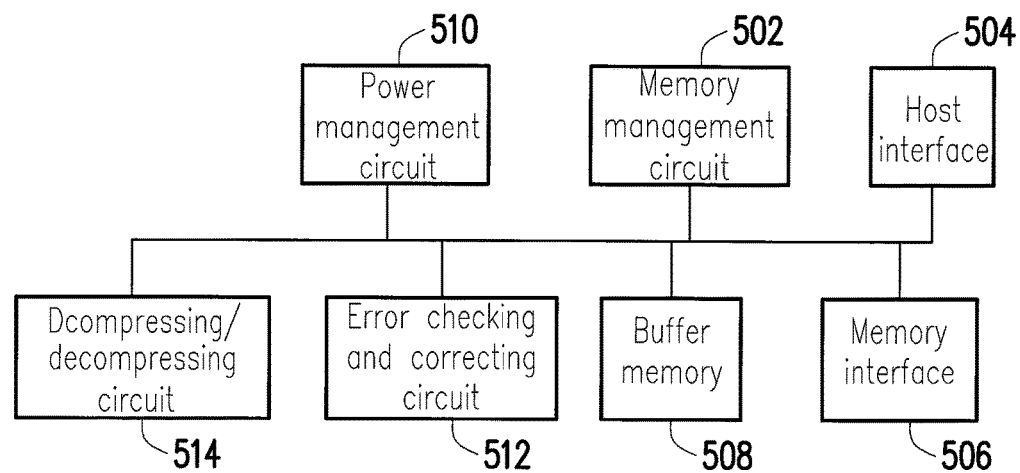
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. During operations of the memory storage device 10, the control commands are executed to execute various operations such as writing, reading and erasing data.

In the present exemplary embodiment, the control commands of the memory management circuit 502 are implemented in a form of a firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment of the invention, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 406 to the random access memory of the memory management circuit 502 when the memory control circuit unit 404 is enabled. Thereafter, the control commands are executed by the microprocessor unit to execute operations of writing, reading or erasing data.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In the present exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

In an exemplary embodiment, the memory control circuit unit 404 further includes a buffer memory 508, a power management circuit 510, an error checking and correcting circuit 512, and a data compressing/decompressing circuit 514.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

The data compressing/decompressing circuit 514 is coupled to the memory management circuit 502. Herein, the data compressing/decompressing circuit 514 is configured to compress the data to be written into the rewritable non-volatile memory module 406 and configured to decompress the data read from the rewritable non-volatile memory module 406. For example, the data compressing/decompressing circuit 514 includes a compressor and a decompressor. The compressor is configured to locate a data redundancy existed in original data, remove the located data redundancy, and encode the rest of necessary data and then output an encoded result (i.e., a compressed data). The decompressor is configured to decode the read compressed data according to given steps and output a decoded result (i.e., a decompressed data). In the present exemplary embodiment, the data compressing/decompressing circuit 514 compresses data by using a lossless compression algorithm, so that the compressed data may be restored later.

Figure 6A:
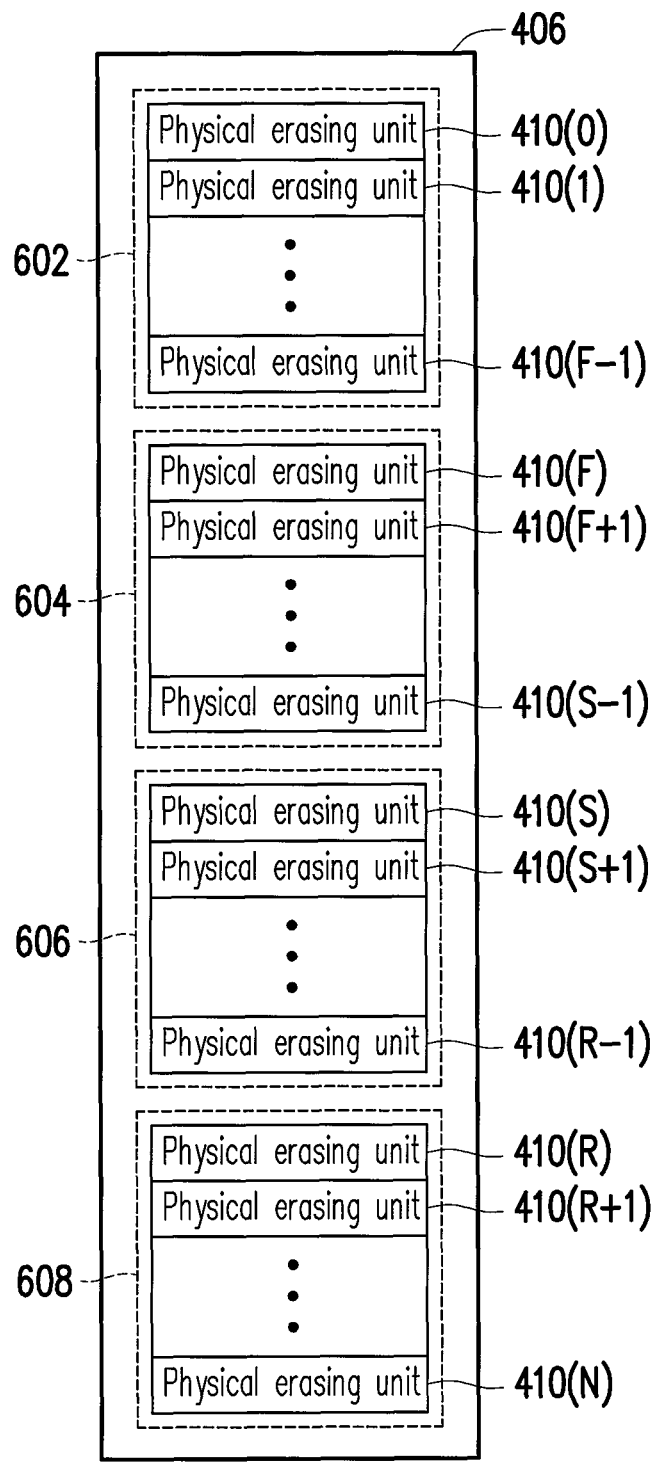
FIG. 6A and FIG. 6B are schematic diagrams illustrating an example of managing the physical erasing units according to an exemplary embodiment.
Figure 6B:
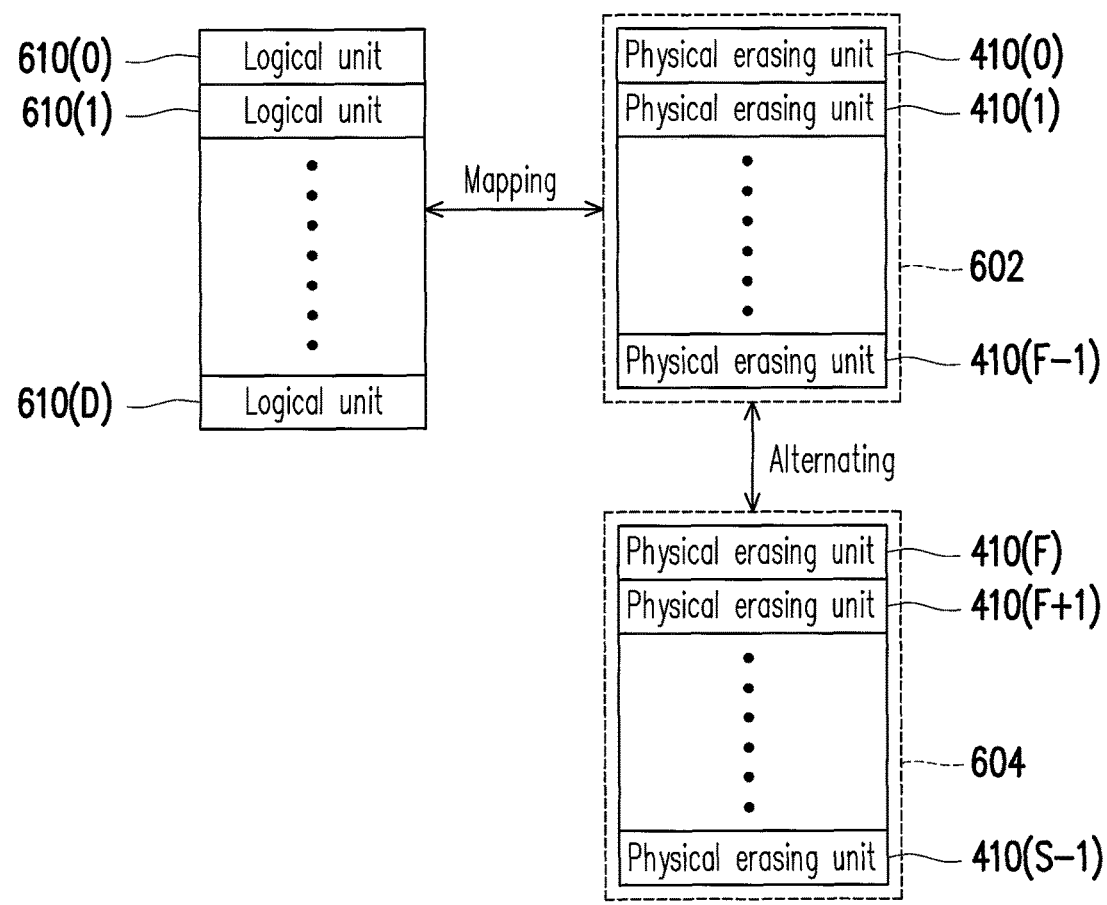

FIG. 6A and FIG. 6B are schematic diagrams illustrating an example of managing the physical erasing units according to an exemplary embodiment.

It should be understood that terms, such as "select", "get", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 6A, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to substitute the physical erasing units of the data area 602. In other words, when the write command and the data to be written are received from the host system 11, the memory management unit 502 selects the physical erasing units from the spare area 604, and writes the data into the selected physical erasing units in order to replace the physical erasing units in the data area 602. Generally, after being operated by users, the physical erasing units in the data area 602 is stored with valid data, whereas the physical erasing units in the spare area 604 are the physical erasing units not stored with the valid data.

The physical erasing units logically belonging to the system area 606 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 608 are used in a bad physical erasing unit replacement procedure for replacing damaged physical erasing units. More specifically, if available physical erasing units still exists in the replacement area 608 when the physical erasing units of the data area 602 are damaged, the memory management circuit 502 gets the available physical erasing units from the replacement area 608 for replacing the damaged physical erasing units.

Particularly, the numbers of the physical erasing units in the data area 602, the spare area 604, the system 606 and the replacement area 608 may be different from one another according to the different memory specifications. In addition, it should be understood that, during operations of the memory storage device 10, grouping relations of the physical erasing units for associating with the data area 602, the spare area 604, the system area 606, and replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 6B, as described above, the physical erasing units of the data area 602 and the spare area 604 are configured for storing data written from the host system 11 in an alternating manner. In the present exemplary embodiment, the memory control circuit unit 404 (or the memory management circuit 502) may assign logical units 610(0) to 610(D) to the host system 11 for mapping a part of physical erasing units 414(0) to 410(F−1) in the data area 602, so as to facilitate in data accessing on the physical erasing units which store the data in the alternating manner. Particularly, the host system 11 may access the data in the data area 602 through the logical units 610(0) to 610(D). Further, the memory control circuit unit 404 (or the memory management circuit 502) establishes a logical-physical mapping table to record a mapping relation between logical units and physical units. The logical-physical mapping table may also record, for example, various corresponding relations between the logical units and the physical units, such as a mapping relation between the logical units and the physical programming units, a mapping relation between the logical programming units and the physical programming units and/or a mapping relation between the logical programming units and the physical erasing units, which are not particularly limited by the invention. For instance, in the present exemplary embodiment, the memory control circuit unit 404 (or the memory management circuit 502) stores the logical-physical mapping table into the physical erasing units belonging to the system area 606 in the rewritable non-volatile memory module 406 for recording each physical erasing unit mapped to the logical unit, and the logical-physical mapping table is loaded into the buffer memory 508 for maintenance when the memory control circuit unit 404 (or the memory management circuit 502) intends to access the data.

In the present exemplary embodiment, the rewritable non-volatile memory module 406 of the memory storage device 10 is managed based on the physical programming units (also known as page based). For example, when the write command is executed, regardless of the logical programming units corresponding to which logical unit are to be written with the current data, the memory control circuit unit 404 (or the memory management unit 502) writes the data in a manner of one physical programming unit after another physical programming unit (hereinafter, also known as a random writing mechanism). Specifically, the memory control circuit unit 404 (or the memory management circuit 502) retrieves an empty physical erasing unit from the spare area 604 as a physical erasing unit currently in use for writing data (also known as an active physical erasing unit). Further, when the current physical erasing unit used is fully written, the memory control circuit unit 104 (or the memory management circuit 202) retrieves another empty physical erasing unit from the spare area 604 to serve as the current physical erasing unit used to continuously write the data corresponding to the write command from the host system 11.

In the present exemplary embodiment, the memory control circuit unit 404 (or the memory management circuit 502) further establishes a physical-logical mapping table in the buffer memory 508, such that after programming a plurality of programming data into one active physical erasing unit gotten from the physical erasing units in the spare area 604, a mapping record corresponding to the active physical erasing unit can be recorded into the physical-logical mapping table. Herein, the mapping record is a mapping relation of the physical programming units of the active physical erasing unit being gotten, and the programming data are data already compressed by the memory control circuit unit 404 (or the data compressing/decompressing circuit 514). For instance, according to the number of the physical programming units not yet programmed in the active physical erasing unit and the size of the physical-logical mapping table, the memory control circuit unit 404 (or the memory management circuit 502) writes the physical-logical mapping table of the active physical erasing unit from the buffer memory 508 into the physical programming units not yet programmed in the active physical erasing unit at right moment. For example, the memory control circuit unit 404 (or the memory management circuit 502) determines whether a difference between the number of the physical programming units not yet programmed in the active physical erasing unit and the number of table pages of the physical-logical mapping table is less than a predetermined number. When determining that the difference is less than the predetermined number, the memory control circuit unit 404 (or the memory management circuit 502) performs aforesaid operation of writing the physical-logical mapping table of the active physical erasing unit from the buffer memory 508 into the physical programming units not yet programmed in the active physical erasing unit. That is to say, in the present exemplary embodiment, when a value of the predetermined number is set to be smaller, a probability for effectively utilizing each of the physical programming units in the active physical erasing unit is higher. However, the present invention is not intended to limit the size of the predetermined number, which can be adjusted and set based on user demands or an execution performance of the memory storage device 10.

In order to describe the operation of accessing the physical-logical mapping table of the invention more clearly, an example is provided below with reference to FIG. 7A to FIG. 7C, FIG. 8A to FIG. 8C and FIG. 9A to FIG. 9B.

FIG. 7A to FIG. 7C are schematic diagrams illustrating an example of recording the mapping relation between the physical units corresponding to the programming data being written and the logical units into the physical-logical mapping table according to an exemplary embodiment.

Referring to FIG. 7A, in this example, the memory control circuit unit 404 (or the memory management circuit 502) receives at least one write command and a plurality of page data WD1 to WD4 corresponding to the at least one write command, wherein the at least one write command instructs to store the page data WD1 to WD4 into a plurality of logical units. For example, the size of each page data is the size of one physical programming unit, and the write command instructs to store the page data WD1, the page data WD2, the page data WD3 and the page data WD4 into the logical unit 610(1), the logical unit 610(2), the logical unit 610(3) and the logical unit 610(4) respectively.

In the present exemplary embodiment, it is assumed that the writing data can be compressed into the programming data having ¼ times the size of the writing data. Accordingly, the memory control circuit unit 404 (or the data compressing/decompressing circuit 514) compresses the page data WD1, the page data WD2, the page data WD3 and the page data WD4 into programming data CD1, programming data CD2, programming data CD3 and programming data CD4, and the size of each of the programming data CD1, the programming data CD2, the programming data CD3 and the programming data CD4 is ¼ times the size of the respective one of the page data WD1, the page data WD2, the page data WD3 and the page data WD4 (as shown in FIG. 7A).

Referring to FIG. 7B and FIG. 7C, as described above, the memory control circuit unit 404 (or the memory management circuit 502) establishes a physical-logical mapping table 700 in the buffer memory 508, and programs the programming data CD1 to CD4 into one physical erasing unit 410(F) (also known as a first physical erasing unit 410(F)) gotten from the physical erasing units in the spare area 604. Herein, the page data is compressed into the programming data having ¼ times the original size of the page data by the memory control circuit unit 404 (or the data compressing/decompressing circuit 514). Accordingly, when the memory control circuit unit 404 (or the memory management circuit 502) programs the programming data CD1 to CD4 into the first physical erasing unit 410(F), the programming data can be completely programmed into a $0^{th}$ physical programming unit (i.e., a physical programming unit 710(0)) in the first physical erasing unit 410(F). In other words, the logical unit 610(1), the logical unit 610(2), the logical unit 610(3) and the logical unit 610(4) are all corresponding to the physical programming unit 710(0). Further, according to the current mapping relation between the physical programming unit and logical units, the memory control circuit unit 404 (or the memory management circuit 502) arranges the mapping relation between the physical programming unit 710(0) and the logical unit 610(1), the logical unit 610(2), the logical unit 610(3) and the logical unit 610(4) into the mapping record, and records the mapping record into $0^{th}$ to $3^{rd}$ rows in the physical-logical mapping table 700. For example, the $0^{th}$ row in the physical-logical mapping table 700 indicates that the physical programming unit 710(0) is corresponding to the logical unit 610(1). As such, by analogy, the $1^{st}$ row in the physical-logical mapping table 700 indicates that the physical programming unit 710(0) is corresponding to the logical unit 610(2), the $2^{nd}$ row in the physical-logical mapping table 700 indicates that the physical programming unit 710(0) is corresponding to the logical unit 610(3), and the $3^{rd}$ row in the physical-logical mapping table 700 indicates that the physical programming unit 710(0) is corresponding to the logical unit 610(4).

FIG. 8A to FIG. 8C are schematic diagrams illustrating an example of recording the mapping relation between the physical units corresponding to the writing data and the logical units into the physical-logical mapping table according to another exemplary embodiment.

Referring to FIG. 8A to FIG. 8C, in this example, when the memory control circuit unit 404 (or the memory management circuit 502) receives another write command and page data WD5 and page data WD6 corresponding to the another write command, the memory control circuit unit 404 (or the memory management circuit 502) can identify that the another write command instructs to store the page data WD5 and the page data WD6 into the logical unit 610(5) and the logical unit 610(6) respectively. Herein, it is assumed that, after the compression, the sizes of the programming data CD5 and the programming data CD6 are respectively identical to the sizes the page data WD5 and the page data WD6 before the compression (as shown in FIG. 8A). Thereafter, similarly, the memory control circuit unit 404 (or the memory management circuit 502) establishes a physical-logical mapping table 800 in the buffer memory 508, and programs the programming data CD5 and the programming data CD6 into another physical erasing unit 410(F+1) (also known as a second physical erasing unit 410(F+1)) gotten from the physical erasing units in the spare area 504. The page data is compressed into the programming data having 1 times the original size of the page data by the memory control circuit unit 404 (or the data compressing/decompressing circuit 514). Accordingly, when the memory control circuit unit 404 (or the memory management circuit 502) programs each of the programming data CD5 and the programming data CD6 into the second physical erasing unit 410(F+1), the programming data CD5 and the programming data CD6 can be programmed into a 0th physical programming unit (i.e., a physical programming unit 810(0)) and a $1^{st}$ physical programming unit (i.e., a physical programming unit 810(1)) in the second physical erasing unit 410(F+1), respectively. In other words, the physical programming unit 810(0) and the physical programming unit 810(1) are corresponding to the logical unit 610(5) and the logical unit 610(6) respectively (as shown in FIG. 8B). Thereafter, according to the current mapping relation between the physical programming unit and the logical units, the memory control circuit unit 404 (or the memory management circuit 502) arranges a mapping relation between the physical programming unit 810(0) and the logical unit 610(5) and between the physical programming unit 810(1) and the logical unit 610(6) into a mapping record, and records the mapping relation into $0^{th}$ to $1^{st}$ rows in the physical-logical mapping table 800 (as shown in FIG. 8C). For example, the $0^{th}$ row in the physical-logical mapping table 800 indicates that the physical programming unit 810(0) is corresponding to the logical unit 610(5), and the $1^{st}$ row in the physical-logical mapping table 800 indicates that the physical programming unit 810(1) is corresponding to the logical unit 610(6).

Referring to FIG. 7A to FIG. 7C and FIG. 8A to FIG. 8C, in view of the mapping record of the physical units and the logical units recorded in the physical-logical mapping table 700 and the mapping record of the physical units and the logical units recorded in the physical-logical mapping table 800, the size of the physical-logical mapping table 700 and the size of the physical-logical mapping table 800 dynamically change according to the size of the page data and the size of the programming data, and the size of the physical-logical mapping table 700 is different from the size of the physical-logical mapping table 800. Specifically, if each of the page data belonging to four logical units is compressed into the programming data with ¼ times the original size of the page data, one physical programming unit can be stored with all the programming data, wherein the programming data are corresponding to the four different logical units, and four fields are required for recording the mapping record (as shown in FIG. 7C). On the other hand, if the size of the programming data obtained after compressing the page data has the same size of the page data, one physical programming unit is only stored with the programming data belonging to one logical unit, and only one field is required for recording the mapping record (as shown in FIG. 8C). In other words, a field space in the physical-logical mapping table 700 required by the mapping record of one physical programming unit capable of storing four compressed programming data is 4 times a filed space in the physical-logical mapping table 800 required by the mapping record of one physical programming unit storing only one compressed programming data. As such, it can be known that the size of the page data and the size of programming data obtained after compressing the page data are factors that influence the size of the physical-logical mapping table.

Herein, referring to the example of accessing the physical-logical mapping table as shown in FIG. 7A to FIG. 7C, if a storage space having 4 times the size of the storage space required by uncompressed page data is preserved in the first physical erasing unit 410(F) by the memory control circuit unit 404 (or the data compressing/decompressing circuit 514) according to a preset compression ratio, a situation will occur in the case where not all the page data can be compressed according to the compression ratio, resulting in that the physical programming units preserved in the first physical erasing unit 410(F) cannot be fully utilized when the physical-logical mapping table 700 of the first physical erasing unit 410(F) is to be written from the buffer memory 508 into the first physical erasing unit 410(F). Accordingly, in the present exemplary embodiment, instead of preserving the storage space having 4 times the size of the storage space required by the uncompressed page data in the first physical erasing unit 410(F), the memory control circuit unit 404 (or the memory management circuit 502) writes the physical-logical mapping table 700 of the first physical erasing unit 410(F) from the buffer memory 508 into the physical programming units not yet programmed in the first physical erasing unit 410(F) according to the difference between the number of the physical programming units not yet programmed in the first physical erasing unit 410(F) and the number of the table pages of the physical-logical mapping table 700.

Figure 9A:
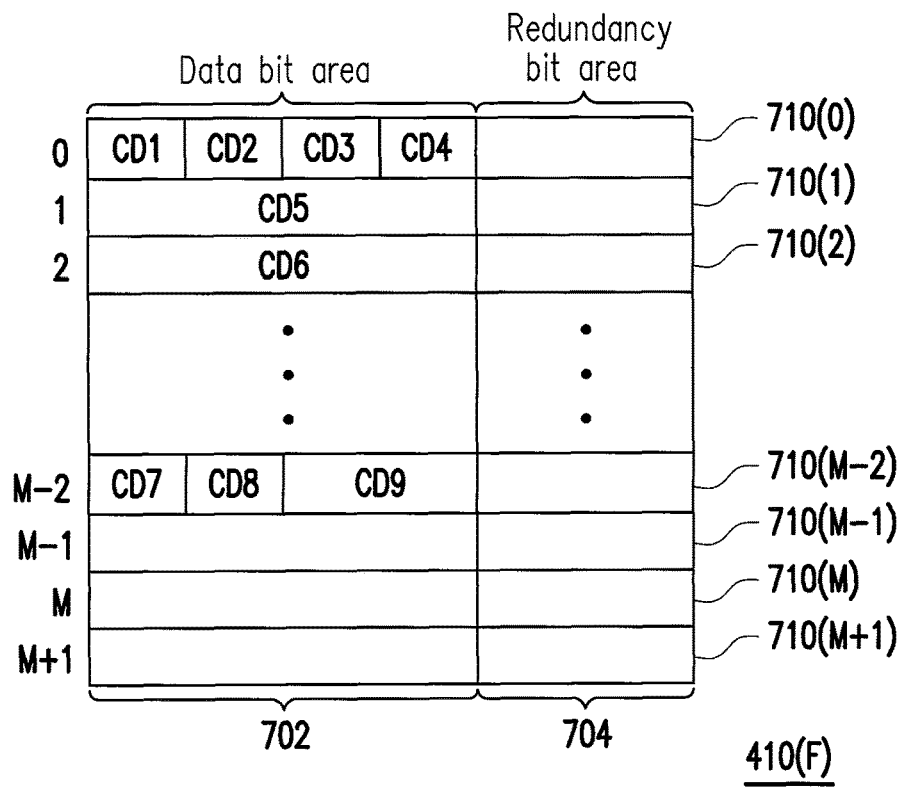
FIG. 9A and FIG. 9B are schematic diagrams illustrating an example of dividing the physical-logical mapping table into a plurality of table pages according to an exemplary embodiment.
Figure 9B:
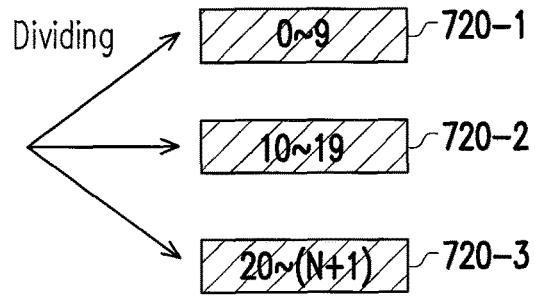

FIG. 9A and FIG. 9B are schematic diagrams illustrating an example of dividing the physical-logical mapping table into a plurality of table pages according to an exemplary embodiment.

Referring to FIG. 9A and FIG. 9B, it is assumed that the physical programming units in the first physical erasing unit 410(F) currently stored with the programming data are the physical programming units 710(0) to 710(M−2) (as shown in FIG. 9A), and a mapping relation between the physical programming units 710(0) to 710(M−2) and the logical units corresponding to the physical programming units 710(0) to 710(M−2) is recorded into $0^{th}$ to $(N+1)^{th}$ rows in the physical-logical mapping table 700 (as shown in FIG. 9B). In the present exemplary embodiment, when the memory control circuit unit 404 (or the memory management circuit 502) determines that the number of the physical programming units not yet programmed in the first physical erasing unit 410(F) is enough for writing the current physical-logical mapping table 700, the memory control circuit unit 404 (or the memory management circuit 502) sequentially divides the physical-logical mapping table 700 into a plurality of table pages according to the size of the data bit area. For example, according to the size of the data bit area, the memory control circuit unit 404 (or the memory management circuit 502) sequentially divides the physical-logical mapping table 700 into a first table page 720-1 corresponding to the mapping relation of $0^{th}$ to $9^{th}$ rows in the physical-logical mapping table 700, a second table page 720-2 corresponding to the mapping relation of $10^{th}$ to $19^{th}$ rows in the physical-logical mapping table 700, and the last table page 720-3 corresponding to the mapping relation of $20^{th}$ to $(N+1)^{th}$ rows in the physical-logical mapping table 700. Because the memory control circuit unit 404 (or the memory management circuit 502) divides the table pages according to the size of the data bit area, each of sizes of the first table page 720-1, the second table page 720-2 and the last table page 720-3 is equivalent to the size of the data bit area.

Figure 10:
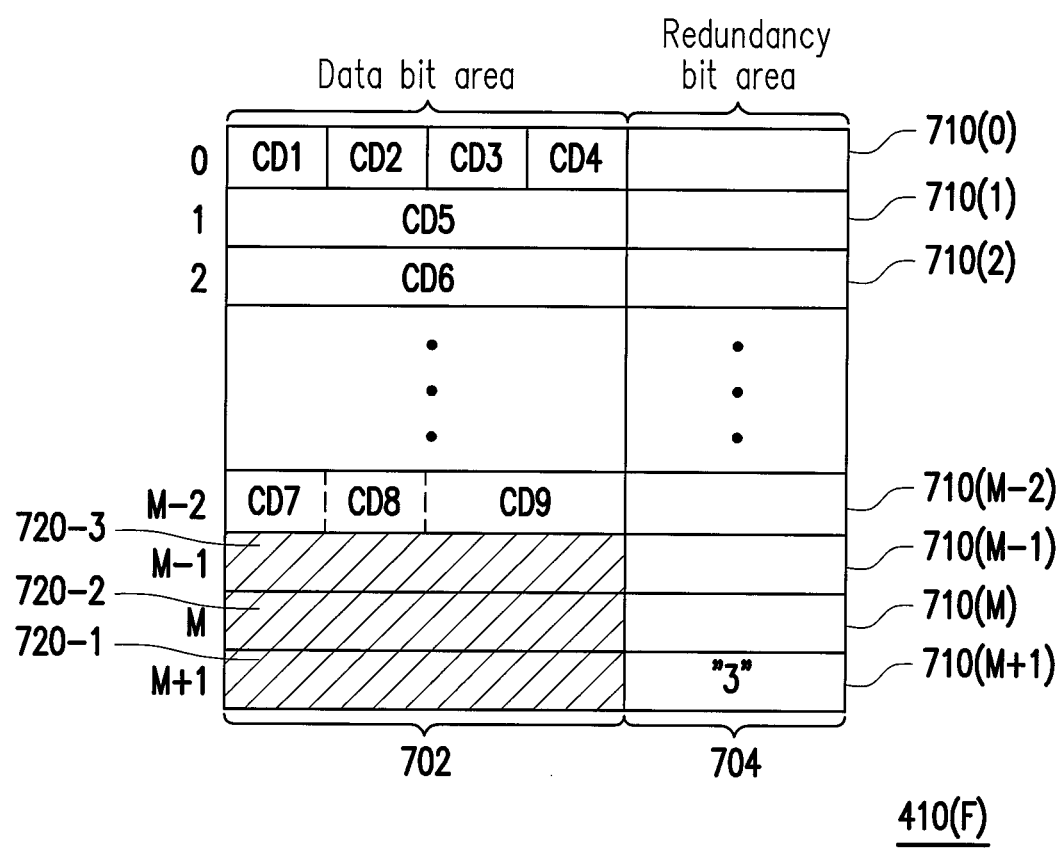
FIG. 10 is a schematic diagram illustrating an example of accessing the physical-logical mapping table according to an exemplary embodiment.

FIG. 10 is a schematic diagram illustrating an example of accessing the physical-logical mapping table according to an exemplary embodiment.

Referring to FIG. 10, in the state as shown in FIG. 9A and FIG. 9B, starting from the last table page 720-3 corresponding to the mapping relation of $20^{th}$ to $(N+1)^{th}$ rows in the physical-logical mapping table 700 to the first table page 720-1 corresponding to the mapping relation of $0^{th}$ to $9^{th}$ in the physical-logical mapping table 700, the memory control circuit unit 404 (or the memory management circuit 502) sequentially stores the last table page 720-1, the second table page 720-2 and the last table page 720-3 of the physical-logical mapping table 700 from the buffer memory 508 into the first physical erasing units 410(F) and records the number of the table pages. For example, the last table page 720-3 is stored into a data bit area 702 of the physical programming unit 710(M−1), the second table page 720-2 is stored into the data bit area 702 of the physical programming unit 710(M) previous to the last physical programming unit 710(M+1) in the first physical erasing unit 410(F), and the first table page 720-1 is successively stored into the data bit area 702 of the last physical programming unit 710(M+1) in the first physical erasing unit 410(F). In this exemplary embodiment, a total of the table pages (i.e., the first table page 720-1, the second table page 720-2 and the last table page 720-3) is 3. Accordingly, while storing the first table page 720-1 of the physical-logical mapping table 700 from the buffer memory 508 into the data bit area 702 of the last physical programming unit 710(M+1) in the first physical erasing unit 410(F), the memory control circuit unit 404 (or the memory management circuit 502) records the number "3" of the table pages into a redundancy bit area 704 of the last physical programming unit 710(M+1) in the first physical erasing unit 410(F). However, the present invention is not limited thereto. For example, in another exemplary embodiment, the memory control circuit unit 404 (or the memory management circuit 502) records the number "3" of the table pages into the redundancy bit areas 704 of all the physical programming units stored with the physical-logical mapping table 700 (i.e., the physical programming unit 710(M−1), the physical programming unit 710(M) and the physical programming unit 710(M+1)).

Specifically, when the memory control circuit unit 404 (or the memory management circuit 502) intends to update the logical-physical mapping table or execute a garbage collection operation according to the physical-logical mapping table 700, the memory control circuit unit 404 (or the memory management circuit 502) reads the physical-logical mapping table 700 from the first physical erasing unit 410(F). Referring back to FIG. 10, the memory control circuit unit 404 (or the memory management circuit 502) reads the first table page 720-1 of the physical-logical mapping table 700 from the data bit area 702 of the last physical programming unit 710(M−1) in the first physical erasing unit 410(F) and reads the number "3" of the table pages of the physical-logical mapping table 700 from the redundancy bit area 704 of the last physical programming unit 710(M−1) in the first physical erasing unit 410(F). Subsequently, the memory control circuit unit 404 (or the memory management circuit 502) temporarily stores the first table page 720-1 of the physical-logical mapping table 700 read from the data bit area 702 of the last physical programming unit 710(M−1) in the first physical erasing unit 410(F) into the buffer memory 508. Thereafter, according to the number (i.e., "3") of the table pages of the physical-logical mapping table 700 read from the redundancy bit area 704 of the last physical programming unit 710(M−1) in the first physical erasing unit 410(F), the memory control circuit unit 404 (or the memory management circuit 502) sequentially reads other table pages of the physical-logical mapping table 700 from the data bit areas 702 of the physical programming units arranged in front of the last physical programming unit 710(M+1) in the first physical erasing unit 410(F) and temporarily stores the read other table pages into the buffer memory 508.

For example, according to the number (i.e., "3") of the table pages, the memory control circuit unit 404 (or the memory management circuit 502) identifies that the three table pages corresponding to the physical-logical mapping table 700 are stored in the last physical programming unit 710(M+1) in the first physical erasing unit 410(F) and another two physical programming units arranged in front of the last physical programming unit 710(M+1) in the first physical erasing unit 410(F), respectively. Therefore, after the memory control circuit unit 404 (or the memory management circuit 502) temporarily stores the first table page 720-1 of the physical-logical mapping table 700 read from the data bit area 702 of the last physical programming unit 710(M+1) in the first physical erasing unit 410(F) into the buffer memory 508, the memory control circuit unit 404 (or the memory management circuit 502) first reads the table page 720-2 of the physical-logical mapping table 700 from the data bit area 702 of the physical programming unit 710(M) and temporarily stores the table page 720-2 into the buffer memory 508, and then reads the table page 720-3 of the physical-logical mapping table 700 from the data bit area 702 of the physical programming unit 710(M−1) and temporarily stores the table page 720-3 into the buffer memory 508.

FIG. 11 is a schematic diagram illustrating an example of accessing the physical-logical mapping table according to another exemplary embodiment.

Referring to FIG. 11, in another exemplary embodiment, it is also possible that the memory control circuit unit 404 (or the memory management circuit 502) can sequentially store the first table page 720-1, the second table page 720-2 and the last table page 720-3, starting from the first table page 720-1 corresponding to the mapping relation of $0^{th}$ to $9^{th}$ rows in the physical-logical mapping table 700 to the last table page 720-3 corresponding to the mapping relation of $20^{th}$ to $(N+1)^{th}$ rows in the physical-logical mapping table 700, from the buffer memory 508 into the first erasing unit 410(F). For example, the first table page 720-1 is stored into the data bit area 702 of the physical programming unit 710(M−1) in the first physical erasing unit 410(F), the second table page 720-2 is stored into the data bit area 702 of the physical programming unit 710(M) previous to the last physical programming unit 710(M+1) in the first physical erasing unit 410(F), and the last table page 720-3 is successively stored into the data bit area 702 of the last physical programming unit 710(M+1).

Particularly, in this exemplary embodiment, while storing the first table page 720-1 into the data bit area 702 of the physical programming unit 710(M−1) in the first physical erasing unit 410(F), the memory control circuit unit 404 (or the memory management circuit 502) further records a corresponding relation "1-3" of table page information of the current table page (i.e., the first table page 720-1) and the number of the table pages into the redundancy bit area 704 of the physical programming unit 710(M−1) in the first physical erasing unit 410(F). Herein, the corresponding relation "1-3" of the table page information of the current table page and the number of the table pages can indicate that the table page recorded in the data bit area 702 of the physical programming unit 710(M−1) is the first table page among the three table pages arranged in the physical-logical mapping table 700. Similarly, while storing the second table page 720-2 into the data bit area 702 of the physical programming unit 710(M) in the first physical erasing unit 410(F), the memory control circuit unit 404 (or the memory management circuit 502) records a corresponding relation "2-3" of table page information of the current table page (i.e., the second table page 720-2) and the number of the table pages into the redundancy bit area 704 of the physical programming unit 710(M) in the first physical erasing unit 410(F). Also, while storing the last table page 720-3 into the data bit area 702 of the physical programming unit 710(M+1) in the first physical erasing unit 410(F), the memory control circuit unit 404 (or the memory management circuit 502) records a corresponding relation "3-3" of table page information of the current table page (i.e., the last table page 720-3) and the number of the table pages into the redundancy bit area 704 of the physical programming unit 710(M+1) in the first physical erasing unit 410(F).

In this example, when the memory control circuit unit 404 (or the memory management circuit 502) intends to update the logical-physical mapping table or execute the garbage collection procedure according to the physical-logical mapping table 700, if the physical-logical mapping table 700 is read from the data bit area 702 of the last physical programming unit 710(M+1) in the first physical erasing unit 410(F), the memory control circuit unit 404 (or the memory management circuit 502) can learn that the table page recorded by the data bit area 702 of the physical programming unit 710(M+1) is the third table page among the three table pages arranged in the physical-logical mapping table 700 according to the corresponding relation "3-3" of the table page information of the current table page and the number of the table pages. Accordingly, according to the corresponding relation "3-3" of the table page information of the current table page and the number of the table pages, the memory control circuit unit 404 (or the memory management circuit 502) temporarily stores the last table page 720-3 of the physical-logical mapping table 700 into the buffer memory 508 and preserves a space in the buffer memory 508 for storing the first table page 720-1 and the second table page 720-2 of the physical-logical mapping table 700. Thereafter, the memory control circuit unit 404 (or the memory management circuit 502) first reads the table page 720-2 of the physical-logical mapping table 700 from the data bit area 702 of the physical programming unit 710(M), and then reads the table page 720-1 of the physical-logical mapping table 700 from the data bit area 702 of the physical programming unit 710(M−1) and temporarily stores them into the space preserved in the buffering memory 508. Herein, an arranging sequence of the three table pages of the physical-logical mapping table 700 in the buffer memory 508 are the first table page 720-1, the second table page 720-2 and the last table page 720-3 in that sequence.

In particular, based on aforesaid operation of accessing the physical-logical mapping table of the invention, while reading the last physical programming unit 710(M−1) in the first physical erasing unit 410(F), the memory control circuit unit 404 (or the memory management circuit 502) can identify the amount of the data in the physical-logical mapping table 700, and the memory control circuit unit 404 (or the memory management circuit 502) can read each of the table pages corresponding to the physical-logical mapping table 700 one by one according to the number of the table pages of the physical-logical mapping table 700. In other words, the number of the table pages of the physical-logical mapping table 700 is the size of the physical-logical mapping table 700. Accordingly, in the present exemplary embodiment, the memory control circuit unit 404 (or the memory management circuit 502) can record the size and the storage location of the physical-logical mapping table 700 corresponding to each of the physical programming units without additionally using other tables in other physical erasing units. As a result, an overall operation efficiency of the memory storage device 10 may be improved since the physical programming units of the physical erasing unit can all be effectively utilized.

FIG. 12 is a flowchart illustrating a mapping table accessing method according to an exemplary embodiment.

Referring to FIG. 12, in step S1201, the memory control circuit unit 404 (or the memory management circuit 502) stores a mapping record corresponding to a first physical erasing unit into the first physical erasing unit, wherein the mapping record of the first physical erasing unit is a mapping relation of physical programming units in the first physical erasing unit.

In step S1203, the memory control circuit unit 404 (or the memory management circuit 502) stores a mapping record corresponding to a second physical erasing unit into the second physical erasing unit, wherein the mapping record of the second physical erasing unit is a mapping relation of physical programming units in the second physical erasing unit, and the size of the mapping record of the first physical erasing unit is different from the size of the mapping record of the second physical erasing unit.

Nevertheless, steps depicted in FIG. 12 are described in detail as above so that related description thereof is omitted hereinafter. It should be noted that, the steps depicted in FIG. 12 may be implemented as a plurality of program codes or circuits, and the invention is not limited thereto. Moreover, the method disclosed in FIG. 12 may be implemented with reference to above embodiments or implemented separately, and the invention is not limited thereto.

In summary, the mapping table accessing method divides the physical-logical mapping table into multiple table pages according to the size of the data bit area, and stores the number of the table pages into the redundancy bit area of the last physical programming unit in the physical erasing unit storing the table pages. Because the number of the table pages represents the size of the physical-logical mapping table, without using additional resources, the memory storage system can record the size and the storage location of the physical-logical mapping table corresponding to each physical programming unit and effectively utilize the physical erasing unit to store the mapping table in which the size dynamically changes. Accordingly, in addition to prevent the unnecessary waste of system resource for the rewritable non-volatile memory, the overall operation efficiency of the memory storage system can also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping table accessing method for a rewritable non-volatile memory module, wherein the rewritable non-volatile memory module comprises a plurality of physical erasing units, each of the physical erasing units comprises a plurality of physical programming units, each of the physical programming units comprises a data bit area and a redundancy bit area, the mapping table accessing method comprising:
   storing a mapping record corresponding to a first physical erasing unit into the first physical erasing unit, wherein the mapping record of the first physical erasing unit is a mapping relation of the physical programming units in the first physical erasing unit; and
   storing a mapping record corresponding to a second physical erasing unit into the second physical erasing unit, wherein the mapping record of the second physical erasing unit is a mapping relation of the physical programming units in the second physical erasing unit,
   wherein the size of the mapping record of the first physical erasing unit is different from the size of the mapping record of the second physical erasing unit.

2. The mapping table accessing method of claim 1, wherein the step of storing the mapping record corresponding to the first physical erasing unit into the first physical erasing unit comprises:
   establishing a physical-logical mapping table in a buffer memory;
   programming a plurality of programming data into the first physical erasing unit among the physical erasing units;
   recording the mapping record corresponding to the first physical erasing unit into the physical-logical mapping table; and
   sequentially dividing the physical-logical mapping table into a plurality of table pages according to the size of the data bit area, sequentially storing the table pages of the physical-logical mapping table, starting from a last table page among the table pages to a first table page among the table pages, from the buffer memory into the first physical erasing unit and recording the number of the table pages.

3. The mapping table accessing method of claim 2, further comprising:
   determining whether a difference between the number of the physical programming units not yet programmed in the first physical erasing unit and the number of the table pages of the physical-logical mapping table is less than a predetermined number,
   wherein if the difference is less than the predetermined number, the step of sequentially storing the table pages of the physical-logical mapping table, starting from the last table page among the table pages to the first table page among the table pages, from the buffer memory into the first physical erasing unit and recording the number of the table pages is performed.

4. The mapping table accessing method of claim 2, wherein the first table page among the table pages is stored into a last physical programming unit in the first physical erasing unit, a second table page among the table pages is stored into a physical programming unit previous to the last physical programming unit in the first physical erasing unit, and the number of the table pages is recorded into the redundancy bit area of the last physical programming unit in the first physical erasing unit.

5. The mapping table accessing method of claim 4, further comprising:
receiving at least one write command and a plurality of page data corresponding to the at least one write command from a host system, wherein the at least one write command instructs to store the page data into a plurality of logical units; and
compressing the page data to generate the programming data,
wherein the size of the physical-logical mapping table dynamically changes according to the size of the programming data.

6. The mapping table accessing method of claim 5, wherein the step of recording the mapping record of the physical programming units corresponding to the first physical erasing unit into the physical-logical mapping table comprises: recording the mapping relation between the physical programming units in the first physical erasing unit and the logical units into the physical-logical mapping table.

7. The mapping table accessing method of claim 4, further comprising:
reading the first table page of the physical-logical mapping table from the data bit area of the last physical programming unit in the first physical erasing unit and reading the number of the table pages of the physical-logical mapping table from the redundancy bit area of the last physical programming unit in the first physical erasing unit;
temporarily storing the first table page of the physical-logical mapping table read from the data bit area of the last physical programming unit in the first physical erasing unit into the buffer memory; and
according to the number of the table pages of the physical-logical mapping table read from the redundancy bit area of the last physical programming unit in the first physical erasing unit, sequentially reading other table pages of the physical-logical mapping table from the data bit areas of the physical programming units arranged in front of the last physical programming unit in the first physical erasing unit and temporarily storing the read other table pages into the buffer memory.

8. The mapping table accessing method of claim 1, wherein the step of storing the mapping record corresponding to the first physical erasing unit into the first physical erasing unit further comprises:
establishing a physical-logical mapping table in a buffer memory;
programming a plurality of programming data into the first physical erasing unit among the physical erasing units;
recording the mapping record corresponding to the first physical erasing unit into the physical-logical mapping table; and
sequentially dividing the physical-logical mapping table into a plurality of table pages according to the size of the data bit area, sequentially storing the table pages of the physical-logical mapping table, starting from a first table page among the table pages to a last table page among the table pages, from the buffer memory into the first physical erasing unit and recording the number of the table pages.

9. A memory control circuit unit for controlling a rewritable non-volatile memory module, wherein the rewritable non-volatile memory module comprises a plurality of physical erasing units, each of the physical erasing units comprises a plurality of physical programming units, each of the physical programming units comprises a data bit area and a redundancy bit area, the memory control circuit unit comprising:
a host interface configured to couple to a host system;
a memory interface configured to couple to the rewritable non-volatile memory module; and
a memory management circuit coupled to the host interface and the memory interface,
wherein the memory management circuit is configured to store a mapping record corresponding to a first physical erasing unit into the first physical erasing unit, wherein the mapping record of the first physical erasing unit is a mapping relation of the physical programming units in the first physical erasing unit,
wherein the memory management circuit is further configured to store a mapping record corresponding to a second physical erasing unit into the second physical erasing unit, wherein the mapping record of the second physical erasing unit is a mapping relation of the physical programming units in the second physical erasing unit,
wherein the size of the mapping record of the first physical erasing unit is different from the size of the mapping record of the second physical erasing unit.

10. The memory control circuit unit of claim 9, wherein in the operation of storing the mapping record corresponding to the first physical erasing unit into the first physical erasing unit, the memory management circuit is further configured to establish a physical-logical mapping table in a buffer memory,
wherein the memory management circuit is further configured to program a plurality of programming data into the first physical erasing unit among the physical erasing units,
wherein the memory management circuit is further configured to record the mapping record corresponding to the first physical erasing unit into the physical-logical mapping table,
wherein the memory management circuit is further configured to sequentially divide the physical-logical mapping table into a plurality of table pages according to the size of the data bit area, sequentially store the table pages of the physical-logical mapping table, starting from a last table page among the table pages to a first table page among the table pages, from the buffer memory into the first physical erasing unit and record the number of the table pages.

11. The memory control circuit unit of claim 10, wherein the memory management circuit is further configured to determine whether a difference between the number of the physical programming units not yet programmed in the first physical erasing unit and the number of the table pages of the physical-logical mapping table is less than a predetermined number,
wherein if the difference is less than the predetermined number, the memory management circuit performs the operation of sequentially storing the table pages of the physical-logical mapping table, starting from the last table page among the table pages to the first table page among the table pages, from the buffer memory into the first physical erasing unit and recording the number of the table pages.

12. The memory control circuit unit of claim 10, wherein the first table page among the table pages is stored into a last physical programming unit in the first physical erasing unit, a second table page among the table pages is stored into a physical programming unit previous to the last physical programming unit in the first physical erasing unit, and the number of the table pages is recorded into the redundancy bit area of the last physical programming unit in the first physical erasing unit.

13. The memory control circuit unit of claim 12, wherein the memory management circuit is further configured to receive at least one write command and a plurality of page data corresponding to the at least one write command from a host system, wherein the at least one write command instructs to store the page data into a plurality of logical units,
wherein the memory management circuit is further configured to compress the page data to generate the programming data,
wherein the size of the physical-logical mapping table dynamically changes according to the size of the programming data.

14. The memory control circuit unit of claim 13, wherein in the operation of recording the mapping record of the physical programming units corresponding to the first physical erasing unit into the physical-logical mapping table, the memory management circuit is further configured to record the mapping relation between the physical programming units in the first physical erasing unit and the logical units into the physical-logical mapping table.

15. The memory control circuit unit of claim 12, wherein the memory management circuit is further configured to read the first table page of the physical-logical mapping table from the data bit area of the last physical programming unit in the first physical erasing unit and read the number of the table pages of the physical-logical mapping table from the redundancy bit area of the last physical programming unit in the first physical erasing unit,
wherein the memory management circuit is further configured to temporarily store the first table page of the physical-logical mapping table read from the data bit area of the last physical programming unit in the first physical erasing unit into the buffer memory,
wherein according to the number of the table pages of the physical-logical mapping table read from the redundancy bit area of the last physical programming unit in the first physical erasing unit, the memory management circuit is further configured to sequentially read other table pages of the physical-logical mapping table from the data bit areas of the physical programming units arranged in front of the last physical programming unit in the first physical erasing unit and temporarily store the read other table pages into the buffer memory.

16. The memory control circuit unit of claim 9, wherein in the operation of storing the mapping record corresponding to the first physical erasing unit into the first physical erasing unit, the memory management circuit is further configured to establish a physical-logical mapping table in a buffer memory,
wherein the memory management circuit is further configured to program a plurality of programming data into the first physical erasing unit among the physical erasing units,
wherein the memory management circuit is further configured to record the mapping record corresponding to the first physical erasing unit into the physical-logical mapping table,
wherein the memory management circuit is further configured to sequentially divide the physical-logical mapping table into a plurality of table pages according to the size of the data bit area, sequentially store the table pages of the physical-logical mapping table, starting from a first table page among the table pages to a last table page among the table pages, from the buffer memory into the first physical erasing unit and record a number of the table pages.

17. A memory storage device, comprising:
a connection interface unit configured to couple to a host system;
a rewritable non-volatile memory module comprising a plurality of physical erasing units, wherein each of the physical erasing units has a plurality of physical programming units, and each of the physical programming units has a data bit area and a redundancy bit area; and
a memory control circuit unit coupled to the connection interface unit and the rewritable non-volatile memory module,
wherein the memory control circuit unit is configured to store a mapping record corresponding to a first physical erasing unit into the first physical erasing unit, wherein the mapping record of the first physical erasing unit is a mapping relation of the physical programming units in the first physical erasing unit,
wherein the memory control circuit unit is further configured to store a mapping record corresponding to a second physical erasing unit into the second physical erasing unit, wherein the mapping record of the second physical erasing unit is a mapping relation of the physical programming units in the second physical erasing unit,
wherein the size of the mapping record of the first physical erasing unit is different from the size of the mapping record of the second physical erasing unit.

18. The memory storage device of claim 17, wherein in the operation of storing the mapping record corresponding to the first physical erasing unit into the first physical erasing unit, the memory control circuit unit is further configured to establish a physical-logical mapping table in a buffer memory,
wherein the memory control circuit unit is further configured to program a plurality of programming data into the first physical erasing unit among the physical erasing units,
wherein the memory control circuit unit is further configured to record the mapping record corresponding to the first physical erasing unit into the physical-logical mapping table,
wherein the memory control circuit unit is further configured to sequentially divide the physical-logical mapping table into a plurality of table pages according to the size of the data bit area, sequentially store the table pages of the physical-logical mapping table, starting from a last table page among the table pages to a first table page among the table pages, from the buffer memory into the first physical erasing unit and record a number of the table pages.

19. The memory storage device of claim 18, wherein the memory control circuit unit is further configured to determine whether a difference between the number of the physical programming units not yet programmed in the first physical erasing unit and the number of the table pages of the physical-logical mapping table is less than a predetermined number, wherein if the difference is less than the predetermined number, the memory control circuit unit performs the operation of sequentially storing the table pages of the physical-logical mapping table, starting from the last table page among the table pages to the first table page among the table pages, from the buffer memory into the first physical erasing unit and recording the number of the table pages.

20. The memory storage device of claim 18, wherein the first table page among the table pages is stored into a last physical programming unit in the first physical erasing unit, a second table page among the table pages is stored into a physical programming unit previous to the last physical programming unit in the first physical erasing unit, and the number of the table pages is recorded into the redundancy bit area of the last physical programming unit in the first physical erasing unit.

21. The memory storage device of claim 20, wherein the memory control circuit unit is further configured to receive at least one write command and a plurality of page data corresponding to the at least one write command from a host system, wherein the at least one write command instructs to store the page data into a plurality of logical units, wherein the memory control circuit unit is further configured to compress the page data to generate the programming data, wherein the size of the physical-logical mapping table dynamically changes according to the size of the programming data.

22. The memory storage device of claim 21, wherein in the operation of recording the mapping record of the physical programming units corresponding to the first physical erasing unit into the physical-logical mapping table, the memory control circuit unit is further configured to record the mapping relation between the physical programming units in the first physical erasing unit and the logical units into the physical-logical mapping table.

23. The memory storage device of claim 20, wherein the memory control circuit unit is further configured to read the first table page of the physical-logical mapping table from the data bit area of the last physical programming unit in the first physical erasing unit and read the number of the table pages of the physical-logical mapping table from the redundancy bit area of the last physical programming unit in the first physical erasing unit, wherein the memory control circuit unit is further configured to temporarily store the first table page of the physical-logical mapping table read from the data bit area of the last physical programming unit in the first physical erasing unit into the buffer memory, wherein according to the number of the table pages of the physical-logical mapping table read from the redundancy bit area of the last physical programming unit in the first physical erasing unit, the memory control circuit unit is further configured to sequentially read other table pages of the physical-logical mapping table from the data bit areas of the physical programming units arranged in front of the last physical programming unit in the first physical erasing unit and temporarily store the read other table pages into the buffer memory.

24. The memory storage device of claim 17, wherein in the operation of storing the mapping record corresponding to the first physical erasing unit into the first physical erasing unit, the memory control circuit unit is further configured to establish a physical-logical mapping table in a buffer memory, wherein the memory control circuit unit is further configured to program a plurality of programming data into the first physical erasing unit among the physical erasing units, wherein the memory control circuit unit is further configured to record the mapping record corresponding to the first physical erasing unit into the physical-logical mapping table, wherein the memory control circuit unit is further configured to sequentially divide the physical-logical mapping table into a plurality of table pages according to the size of the data bit area, sequentially store the table pages of the physical-logical mapping table, starting from a first table page among the table pages to a last table page among the table pages, from the buffer memory into the first physical erasing unit and record a number of the table pages.

* * * * *